(12) United States Patent
Henzler et al.

(10) Patent No.: US 10,622,898 B1
(45) Date of Patent: Apr. 14, 2020

(54) VOLTAGE REGULATOR CONTROL SYSTEMS AND METHODS

(71) Applicant: Intel Corporation, Santa Clara, CA (US)

(72) Inventors: Stephan Henzler, Munich (DE); David Herbison, Munich (DE); Emil Neborovski, Munich (DE); Thomas Piorek, Santa Clara (CA); Yifan Wang, Olching (DE); Holger Wenske, Freising (DE); Tobias Werth, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/234,919

(22) Filed: Dec. 28, 2018

(51) Int. Cl.
*H02M 3/158* (2006.01)
*H02M 1/08* (2006.01)
*H02M 1/00* (2006.01)

(52) U.S. Cl.
CPC ........... *H02M 3/1582* (2013.01); *H02M 1/08* (2013.01); *H02M 2001/0009* (2013.01)

(58) Field of Classification Search
CPC ................. H02M 3/1582; H02M 1/08; H02M 2001/0009
See application file for complete search history.

(56) References Cited

U.S. PATENT DOCUMENTS

| | | | |
|---|---|---|---|
| 9,817,416 B2 | 11/2017 | Gebeyehu et al. | |
| 9,837,965 B1 | 12/2017 | Wagh et al. | |
| 2007/0001878 A1 | 1/2007 | Berthold et al. | |
| 2018/0358900 A1* | 12/2018 | Sun | H02M 3/1582 |
| 2019/0181753 A1* | 6/2019 | Sharma | H02M 3/157 |
| 2019/0181759 A1* | 6/2019 | Sharma | H02M 3/1582 |

\* cited by examiner

*Primary Examiner* — Kyle J Moody
(74) *Attorney, Agent, or Firm* — Eschweiler & Potashnik, LLC

(57) ABSTRACT

Systems, methods, and circuitries for regulating voltage supplied to a power amplifier are disclosed. In one example, a buck-boost control system is configured to control a buck-boost converter to operate in either a buck mode or a boost mode. The system includes compensator circuitry configured to determine a target current based on a difference between a target voltage and a regulated output voltage of the buck-boost converter and determine a tolerance current that, with the target current, defines a range of expected coil current for the present operating mode. Based on the difference between the target voltage and the regulated output voltage, a charge control signal or a discharge control signal is generated for the converter to cause the coil current to approach the target current. Mode control circuitry is configured to switch the buck-boost converter to the other operating mode when the coil current reaches the tolerance current.

17 Claims, 10 Drawing Sheets

VOLTAGE REGULATOR CONTROL SYSTEMS AND METHODS

BACKGROUND

Voltage regulators are used to improve the quality of a voltage being supplied to sensitive circuitry. For example, voltage regulators are often used to condition the supply voltage, such as a battery voltage, for power amplifiers in a transceiver. When loading on a voltage regulator varies significantly, the regulated output voltage produced by the voltage regulator may exhibit transients that degrade the performance of the power amplifier. Buck-boost converters, which can reduce a supply voltage to produce a smoother, lower regulated output voltage or increase a supply voltage to produce a smoother, higher regulated output voltage, are one common type of voltage regulator.

DESCRIPTION

Figure 1:
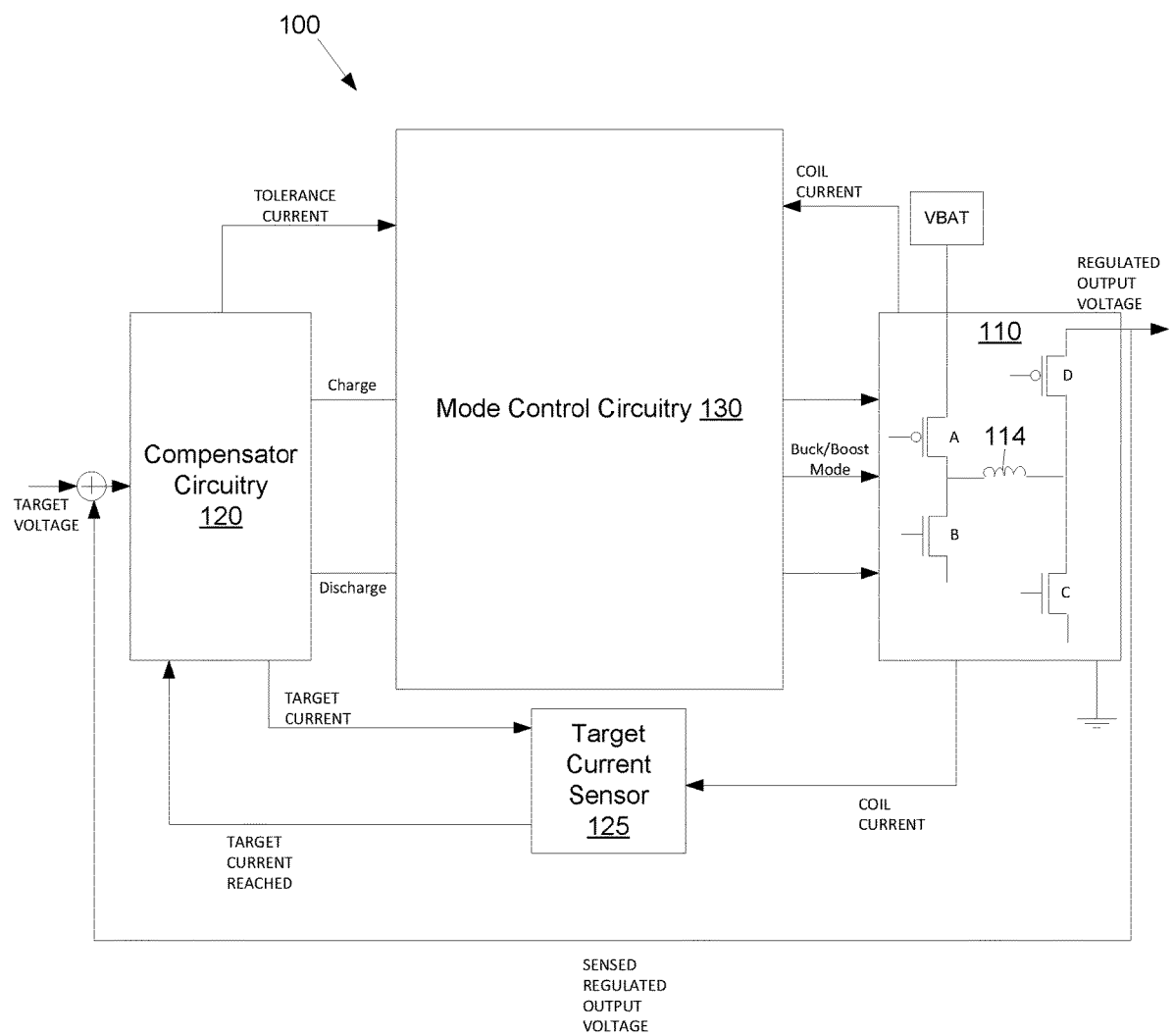
FIG. 1 illustrates an exemplary a buck-boost control system in accordance with various aspects described.

Buck-boost converters are DCDC converters (e.g., switched mode power supplies) which generate a smooth regulated output voltage that can be higher, lower, or equal than a supply voltage. For that purpose the buck-boost converter output stage has more switch devices compared to a pure buck or pure boost converter. Based on a configuration signal, the switches in the output stage can be operated either in a buck switching scheme or in a boost switching scheme. If the regulated output voltage is considerably lower than the supply voltage, the output stage is operated only according to a buck mode switching scheme (hereinafter "buck mode"). If the regulated output voltage is considerably higher than the supply voltage the output stage is operated only in a boost mode switching scheme (hereinafter "boost mode").

Difficulties arise if the regulated output voltage is equal or close to the supply voltage. In this case the output stage is alternately configured between buck mode and boost mode in quick succession. In both modes the duty cycle (e.g., the ratio between coil charge time and coil discharge time) reaches extreme values. In buck mode the duty cycle is close to 100% and in boost mode the duty cycle is close to 0%. These extreme duty cycles are difficult to realize because switch drivers and control comparators in the buck-boost converters have finite latency times which lead to a maximum feasible duty cycle around 90% in buck and a minimum feasible duty cycle around 10% in boost mode. Any duty cycle regime beyond these limits is difficult to realize due to minimum pulse width constraints arising from the latencies. This means, however, that the buck-boost converter may not be able to realize the duty cycles which are needed for good output voltage regulation. As a final consequence the regulated output voltage accuracy is worse and the regulated output voltage exhibits much higher ripple if the regulated output voltage is close to the supply voltage compared to cases where the regulated output voltage is much lower or much higher than the supply voltage.

Some buck-boost converters select a mode based on pure voltage measurements and/or programming. In these buck-boost converters if the measured (e.g., programmed) output voltage is lower than the measured supply voltage then a buck switching scheme is chosen. If the measured (e.g., programmed) output voltage is higher than the measured supply voltage then a boost switching scheme is chosen.

A mode selection criterion that is based on voltage measurements is problematic because the supply voltage and regulated output voltage are usually measured at sense points at the buck-boost converter input and output. However, the relevant indicator is the voltage seen by the coil. This voltage differs from the measured voltages by the voltage drop of the switch devices which is current dependent. As a result the voltage-based decision is failure prone and varies over load current. Boost mode may be chosen from time to time when buck mode is needed and vice versa. Consequently the regulated output voltage may deviate from its target level (causing ripple) until the voltage difference becomes large enough that the correct decision is taken even with voltage-drop effects. This leads to strong ripple in the buck boost transition region. In addition to the ripple, regulated output voltage-based mode selection in the buck-boost transition region often leads to marginal stability and/or oscillations which results in even worse regulated output voltage accuracy.

Described herein are systems, methods, and circuitries that select the mode (buck or boost) based on a coil current measurement and also alter the switching frequency in the buck-boost transition region gradually so that extreme duty cycles can be achieved.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute executable instructions stored in computer readable storage medium and/or firmware that confer(s), at least in part, the functionality of the electronic components.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

Use of the word example is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

FIG. 1 illustrates an exemplary buck-boost control system 100 configured to control a buck-boost converter 110 that regulates a supply voltage VBAT. The buck-boost converter 110 includes a coil 114 having a coil current that is selectively controlled by a set of buck-boost switches (denoted as devices A-D). While particular types of devices (e.g., NMOS, PMOS) are illustrated other devices and configurations for the buck-boost switches may be used. The buck-boost converter 110 operates in either a buck mode or a boost mode. While in either mode, the buck-boost switches are controlled to either charge the coil 114 with the supply voltage or discharge the coil.

The control system 100 includes compensator circuitry 120, mode control circuitry 130, and a target current sensor 125. The compensator circuitry 120 is configured to determine a target current based on a difference between a target voltage and a regulated output voltage of the buck-boost converter. The determined target current is provided to the target current sensor 125, which compares a coil current in the coil 114 with the target current. The target current sensor 125 provides a signal indicating that the coil current has reached the target current to the compensator circuitry 120. In response to the coil current reaching the target current, based on the difference between the target voltage and the regulated output voltage, the compensator circuitry 120 generates either a "charge" control signal or a "discharge" control signal. Depending on whether the buck-boost controller is in buck mode or boost mode, the charge and discharge control signals will operate the buck-boost switches differently.

For example, in the example of FIG. 1, in buck mode, the charge control signal will switch device A ON and OFF based on peak or valley switching, switch devices B and C to OFF, and switch device D to ON. In buck mode the discharge control signal will switch device A to OFF, switch device B ON and peak or valley switching, switch device C to OFF, and switch device D to ON. In boost mode the charge control signal will switch device A to ON, switch device B to OFF, switch device C ON and OFF peak or valley switching, and switch device D to OFF. In boost mode the discharge control signal will switch device A to ON, switch devices B and C to OFF, and switch device D ON and OFF peak or valley switching. Peak and valley switching will be described with reference to FIG. 4.

The compensator circuitry 120 also determines a tolerance current that, with the target current, defines a range of expected coil current for the present operating mode (i.e., either buck mode or boost mode). The mode control circuitry 130 is configured to switch the buck-boost converter 110 from the present operating mode to the other operating mode when the coil current reaches the tolerance current.

In this manner, the exemplary control system 100 controls the buck-boost converter 110 to select between buck mode and boost mode not based on a voltage measurement but rather based on an evaluation as to whether the target current can be reached or cannot be reached in the present operating mode. In buck mode there is a first buck switch configuration for which the coil current rises and a second buck switch configuration where the coil current falls. Similarly, in boost mode there is a first boost switch configuration for which the coil current rises and a second boost switch configuration where the coil current falls. If the coil current in buck mode is falling for both buck switch configurations and as a consequence if the coil current deviates too much from the target current (e.g., reaches the tolerance current), the control system 100 switches the buck-boost converter to boost mode. If the coil current in boost mode is rising for both boost switch configurations and as a consequence if the coil current deviates too much from the target current (e.g., reaches the tolerance current), the control system 100 switches the buck-boost converter to buck mode.

In one example, a variable switching frequency which adapts itself to the coil current slope may be employed by the mode control circuitry 130. Variable switching frequency supports buck mode duty cycles of 99% and beyond and boost mode duty cycles of 1% and below. This enables accurate regulation in the buck-boost transition region.

Figure 2:
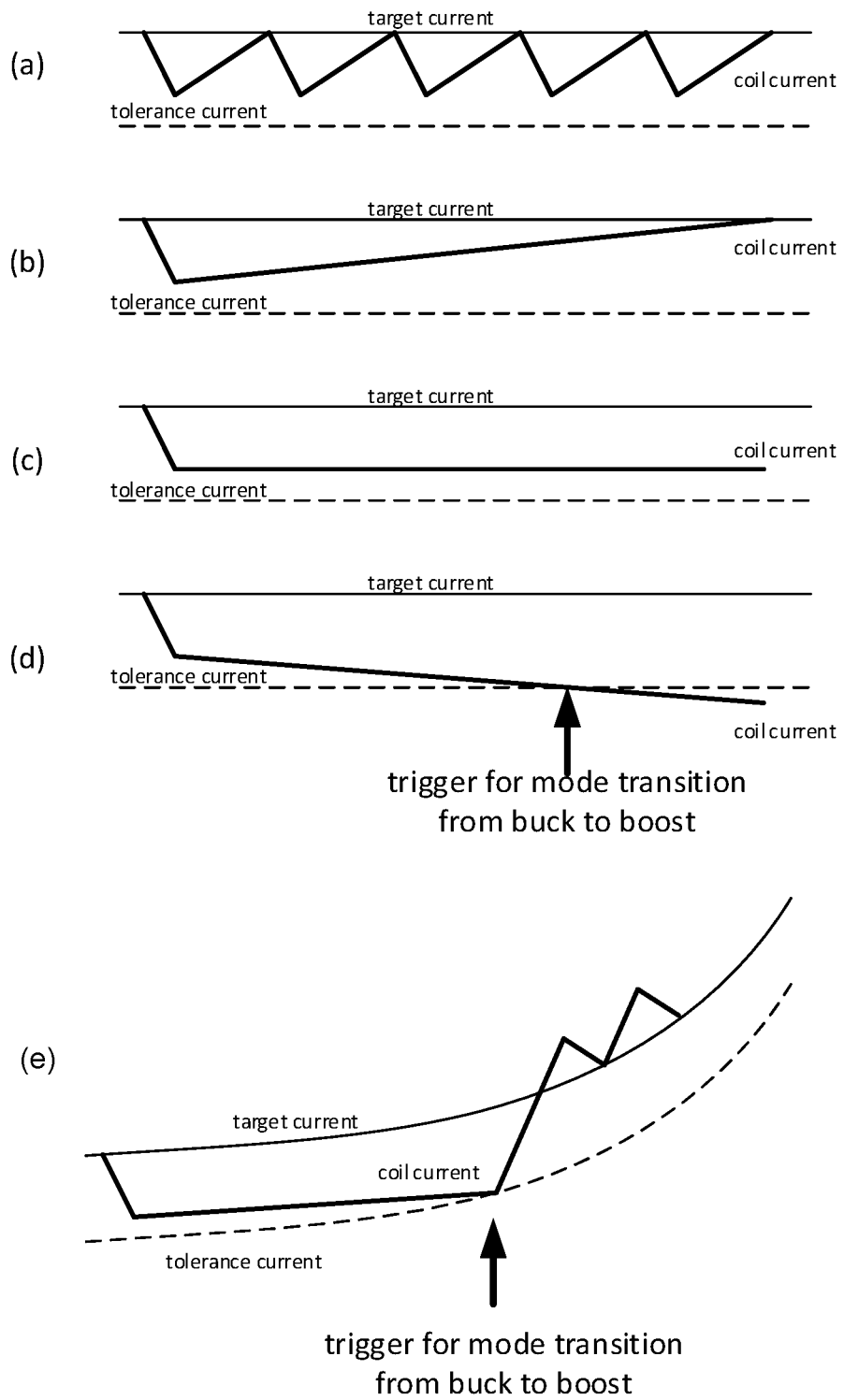
FIGS. 2 and 3 illustrate exemplary operating curves for the buck-boost control system of FIG. 1 in buck mode and boost mode, respectively, in accordance with various aspects described.

FIG. 2 illustrates an exemplary control scheme that may be employed by the mode control circuitry 130 of FIG. 1 in five different scenarios while the buck-boost converter 100 is in buck mode (i.e., the present operating mode is buck mode). The curved line indicates the coil current. If buck mode is the correct mode of operation based on the regulated output voltage and target voltage, the coil current is rising and falling alternately. In buck mode, the coil current should not continue to fall. The top solid line is the target current calculated by the compensator circuitry (120 in FIG. 1). The buck-boost switches are switched such that the coil current follows the target current. The dashed blue line is the tolerance current which is also determined by the compensator circuitry. The tolerance current is derived from the target current and is offset from the target current by a predetermined offset. If the target current rises (or falls) the tolerance current limit also rises (or falls).

The first case (a) shows the buck-boost converter operating in a deep buck mode. Both the rise and fall slopes of the coil current are steep, which indicates that the supply voltage is considerably larger than the regulated output voltage.

The second case (b) indicates a situation where the supply voltage is still larger than the regulated output voltage (effectively at the coil). However, the voltage difference is so small, that the coil current rises very slowly. In one example, hysteretic current control is employed which will automatically reduce the switching frequency. In hysteretic current control, the buck-boost switches remain in the charging state until the coil current reaches the target current. Hysteretic current control is advantageous for efficiency because of less switching events and low ripple because it reduces unnecessary switching in opposite direction. One example of hysteretic current control is described with reference to FIG. 4.

The third case (c) is the corner case where there is zero effective voltage drop across the coil. The coil current just remains where it is. The switching frequency goes to zero (during that phase). As the coil current does not hit the target current in a reasonable time the mode control circuitry 130 would be in an open loop state without the tolerance current. The tolerance current is a kind of safety net which leaves the switching stage in this state only as long as the coil current is not too much below target.

In case (d) the situation is a little bit more extreme. Even in the phase where the coil current should rise it continues to fall. Once the coil current crosses the tolerance current limit, it can be said that the buck mode will not be able to reach the target current. Thus the coil current reaching the tolerance current is the trigger event (indicated by the arrow) used by the mode control circuitry 130 to switch the buck-boost converter 110 into boost mode which then allows more reliable charging of the coil 114.

Case (e) shows the same condition as case (d) except that the regulated output voltage is falling. The coil current initially remains essentially flat which is acceptable as long as the regulated output voltage remains the same. When the regulated output voltage drops, the compensator circuitry 120 increases the target current. Since the coil current is flat the coil current will reach neither the original target current nor the new (rising) target current. However, the coil current must increase in order to react to the falling regulated output voltage. As the tolerance current is rising together with the target current, the flat coil current leaves its tolerance window (due to the tolerance current rising with the target current). Upon the coil current reaching the tolerance current (as indicated by the arrow) the mode control circuitry 130 switches the buck-boost converter 110 from buck mode to boost mode which increases the coil current as requested by the compensator circuitry 120.

Figure 3:
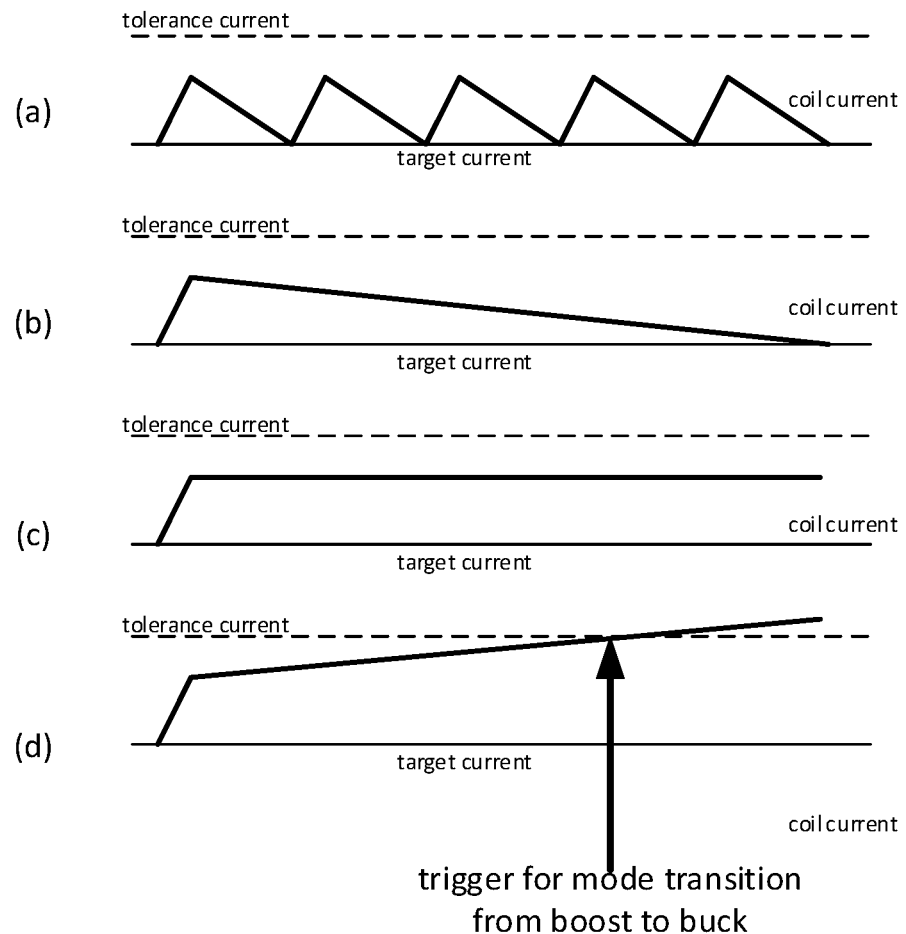

FIG. 3 illustrates an exemplary control scheme that may be employed by the mode control circuitry 130 of FIG. 1 in four different scenarios while the buck-boost converter 100 is in boost mode (i.e., the present operating mode is boost mode). Case (a) is a deep boost mode. The regulated output voltage is considerably higher than the supply voltage. Both the rising slope and the falling slope of the coil current are steep.

In case (b) the regulated output voltage is only slightly higher than the supply voltage. The falling slope becomes very low and the compensator circuitry 120 automatically reduces switching frequency (based on the coil current reaching the target current).

In case (c) the voltage difference between the supply voltage and regulated output voltage is so low that the coil current exhibits zero slope in its fall-phase. As long as the regulated output voltage is sufficient, the buck-boost converter can remain in boost mode. However, if the voltage conditions shift even more as in case (d) the coil current may not fall at all but may even rise when the boost switches are set to cause the coil current to fall. In this situation the coil current will hit the (upper) tolerance current limit. In response to the coil current reaching the tolerance current (as indicated by the arrow) the mode control circuitry will switch the buck-boost converter 110 into buck mode.

Figure 4:
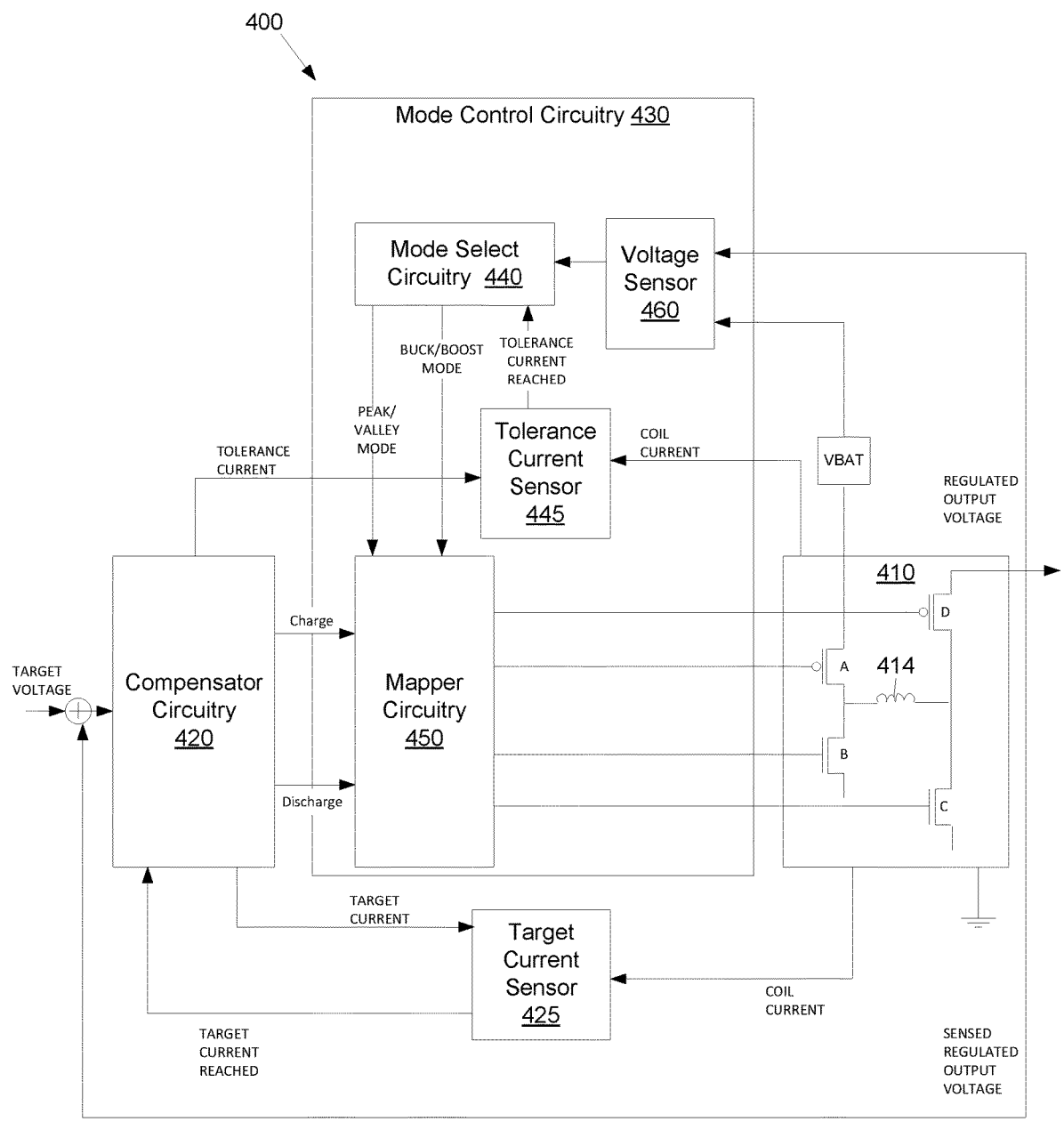
FIG. 4 illustrates an exemplary a buck-boost control system in accordance with various aspects described.

FIG. 4 illustrates an exemplary control system 400 for a buck-boost converter 410. The control system 400 includes compensator circuitry 420 and target current sensor 425, which operate analogously to the compensator circuitry 120 and the target current sensor 125 of FIG. 1, respectively. For example, the compensator circuitry 420 measures the regulated output voltage and compares it to a target output voltage. Based on this measurement the target current is calculated and used by the target sensor 425 for the comparison with the actual current. The compensator circuitry 420 calculates the target current independent on the operation mode (buck or boost). A mapper circuitry 450 translates the charge and discharge commands generated by the compensator circuitry 420 for charging and discharging of the coil into appropriate switch control signals for buck-boost switches (devices A-D). The mapper circuitry 450 translates the charge and discharge commands based on mode information (buck or boost) received from a mode select circuitry 440.

The compensator circuitry 420 uses the target current to calculate the tolerance current. When the buck-boost converter 410 is in buck mode the tolerance current is set below the target current and when the buck-boost converter 410 in boost mode the tolerance current is set above the target current. A tolerance current sensor 445 is configured to receive the coil current, compare the coil current to the tolerance current, and generate a tolerance hit signal when the coil current is equivalent to the tolerance current. The tolerance current sensor 445 measure the same coil current as the target current sensor 425, however the tolerance current sensor 445 may use a different interface or circuit location for the measurement. The mode select circuitry 440 responds to the tolerance hit signal by switching the mode of operation to the other mode (e.g., from boost to buck or buck to boost) as described above.

The mode select circuitry 440 generates a mode selection signal that controls the mapper circuitry 450 to map the commands from the compensator circuitry 420 to cause the buck-boost converter to operate in the selected mode (which is the other mode with respect to the current operating mode). Thus depending on the present operating mode, in response to the coil current reaching the tolerance current the mode select circuitry 440 controls the mapper circuitry 450 to enter either a buck mode or a boost mode. Depending on the mode, the mapper circuitry will translate a charge or discharge command into control signals for the buck-boost switches A-D as described with reference to FIG. 1.

In one example, in addition to selecting between buck or boost mode, the mode select circuitry 440 is also configured to generate a peak or valley switching mode selection signal that selects either a peak switching mode or a valley switching mode based to reduce switching frequency. Peak and valley modes are two sub-modes or hysteretic current control. In hysteretic current control schemes, either the rising or falling phase of coil current is selected as a variable phase while the other phase is selected as a constant phase. In peak switching, the rising phase is the variable phase and the falling phase is the constant phase. This means that in peak switching mode during the rising phase the device being switched (e.g., one of the devices A-D as described in FIG. 1) is controlled (by the mapper circuitry 450) to be ON until the target current is reached (thus the amount of time the device is ON will vary). In the falling phase the device being switched is controlled to be OFF for a predetermined fixed amount of time (constant OFF). In valley switching, falling phase is the variable phase and the rising phase is the constant phase. This means that in valley switching mode during the rising phase the device being switched (e.g., one of the devices A-D as described in FIG. 1) is controlled to be ON for a predetermined fixed amount of time (constant ON). During the falling phase the device being switched is controlled to be OFF until the target current is reached (thus the amount of time the device is OFF will vary).

The mode select circuitry 440 also selects either peak switching mode or valley switching mode based on the relative duration of the variable phase and the fixed phase of the coil current. When the variable phase becomes shorter than the fixed phase, the peak or valley switching mode (peak vs. valley) is changed by the mode select circuitry 440 to the other peak or valley switching mode.

In one example, the control system 400 includes a voltage sensor 460 configured to compare the regulated output voltage with a supply voltage being regulated by the buck-boost converter and generate a difference signal indicative of the difference between the regulated output voltage and the supply voltage. The mode control circuitry 430 is configured to refrain from switching the buck-boost converter to the other operating mode when the difference exceeds a switching threshold. This does not mean that the mode decision is primarily based on a voltage measurement, but rather the difference signal is used as a safeguard by allowing mode switches only if a coarse voltage plausibility check allows it.

The accuracy of the voltage measurement performed by the voltage sensor 460 can be very coarse as it is not the actual switching criterion. For example, if the regulated output voltage for instance is much lower than the supply voltage the mode control circuitry 430 may refrain from switching the buck-boost converter 410 to the boost mode.

Figure 5:
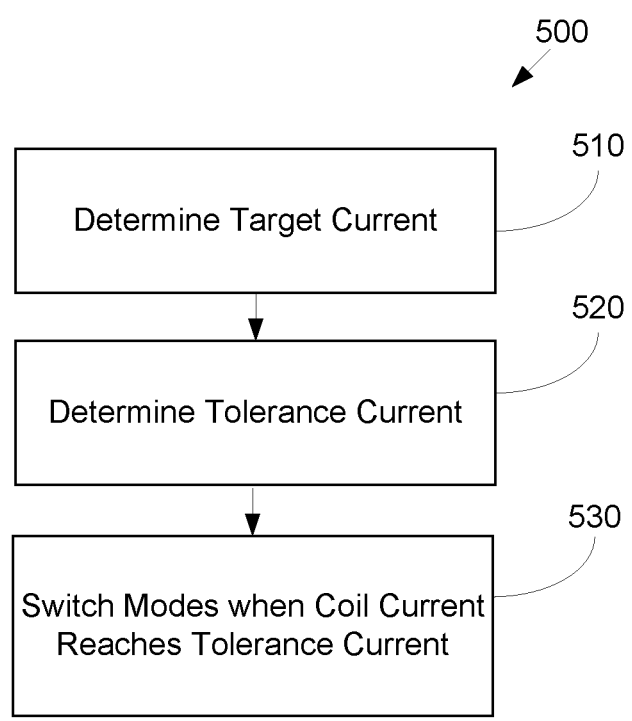
FIG. 5 illustrates an exemplary flow diagram of an exemplary method of controlling a buck boost converter in accordance with various aspects described.

FIG. 5 illustrates a flow diagram outlining an exemplary method 500 configured to control a buck-boost converter to operate in a present operating mode corresponding to either a buck mode or a boost mode. The buck-boost converter includes a coil having a coil current that is selectively controlled by a set of buck-boost switches. The method may be performed, for example, by the control systems 100, 400 of FIGS. 1 and 4, respectively. The method includes, at 510, determining a target current based on a difference between a target voltage and a regulated output voltage of the buck-boost converter and, at 520, determining a tolerance current that, with the target current, defines a range of expected coil current for the present operating mode. At 530, the buck-boost converter is switched from the present operating mode to the other operating mode when the coil current reaches the tolerance current.

It can be seen from the foregoing description that the coil-current based buck-boost converter control systems, circuitries, and methods described herein choose an optimum switching mode for the buck-boost converter to reduce regulated output voltage ripple when the supply voltage is close to the regulated output voltage.

New telecommunication standards like 5G New Radio (NR) have further decreased the settling time requirements for RF Power Management ICs such as envelope trackers and also regular advance power technology (APT) power management ICs. In 5G NR power can be scaled on a symbol-by-symbol basis. A symbol can be as little as 17 us long and therefore a regulated voltage provided to a power amplifier should have a settling time of less than 2 us. This means that the voltage regulator may experience a load step (significant change in the power consumption of the load such as a power amplifier (PA) power transition) or a scaling event (voltage scaling due to envelope tracking) every 17 us and at the same time regulate the resulting regulated voltage errors (e.g., damp transients) within less than 2 us. This is not feasible for state-of-the art voltage regulators with conventional feedback loop design.

Previous power management solutions use a conventional voltage regulator. The regulated output voltage (e.g., the voltage provided to the power amplifier) is measured and compared to a target voltage. The resulting error signal is used to either increase or decrease the regulated output voltage. The large load step leads to a strong variation of the load current. This load current variation causes a voltage degradation which is seen by the voltage loop and then corrected by the voltage regulator. This means that first the regulated output voltage needs to experience a significant degradation before a counter measure is taken.

Regulated output voltage errors can be somewhat minimized with larger output filter capacitors. These capacitors provide the load current until the control loop has reacted and provides more current from the battery; however, large capacitors incur cost and consume valuable PCB area. An additional complication in meeting the 5G NR power management requirements is that 5G NR also requires that the voltage regulator should be able to scale its regulated output voltage quickly. Large capacitors will significantly slow down the voltage scaling capability of the voltage regulator.

Described herein are systems, methods, and circuitries configured to damp transients in regulated output voltages in a feed-forward manner such that a damping mechanism is connected to an output of voltage regulator prior to a load step and disconnected after the load step. In this manner, two feed forward mechanisms are utilized to improve the reaction to fast load transients based on forward looking knowledge of the load transients.

Figure 6:
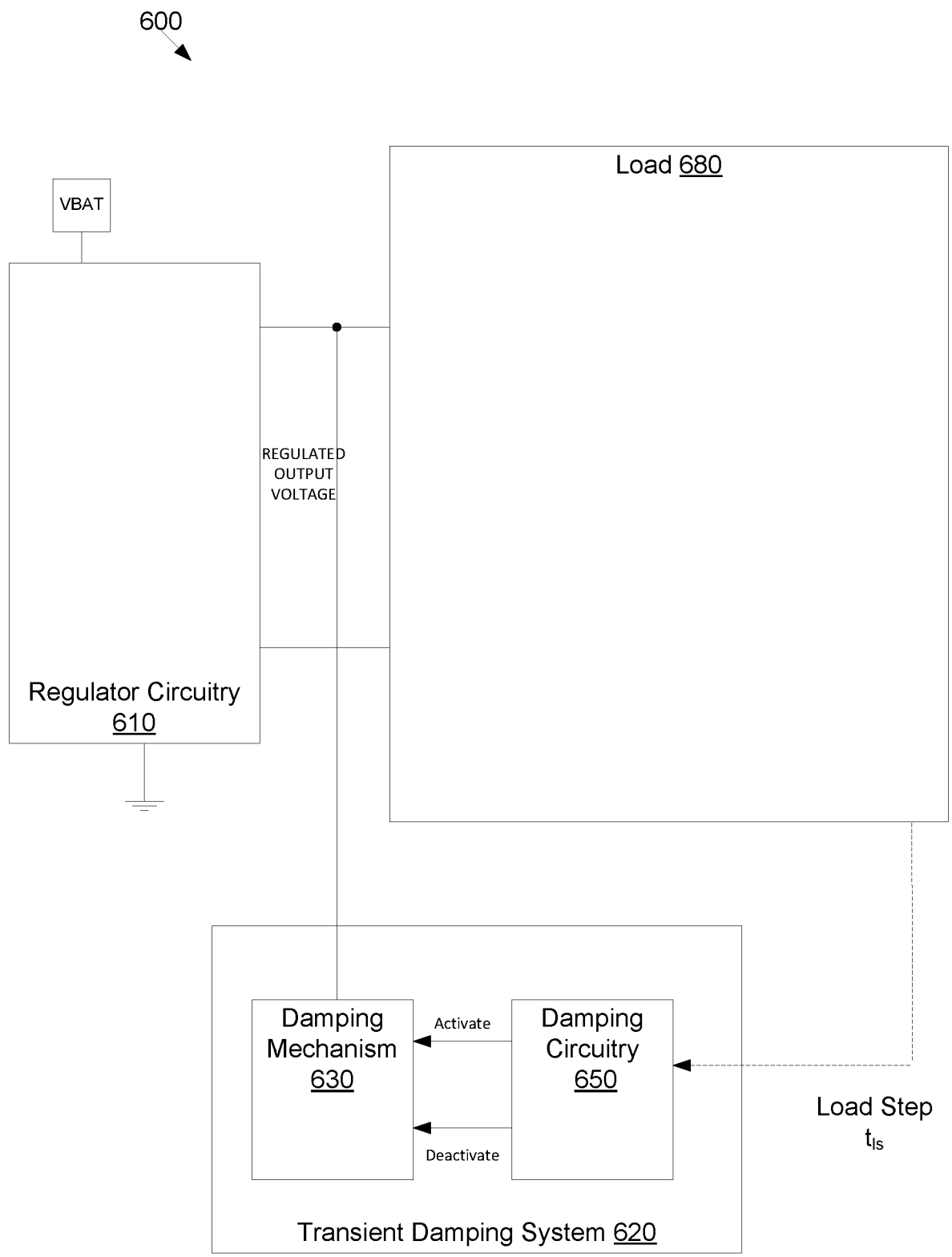
FIG. 6 illustrates an exemplary voltage regulation system that includes a transient damping system in accordance with various aspects described.

FIG. 6 illustrates a voltage regulator system 600 that includes an exemplary transient damping system 620. The voltage regulation system 600 includes regulator circuitry 610 that conditions a supply voltage VBAT to generate an output voltage that is provided to a load 680. The load 680 experiences positive load steps in which a large supply current is abruptly demanded from the regulator circuitry and negative load steps when a large supply current is abruptly discontinued. For example, a positive load step may occur when a power amplifier transitions from a low power mode to a high power mode while a negative load step may occur when a power amplifier transitions from a high power mode to a low power mode. These load steps tend to cause transients in the regulated output voltage produced by the regulator circuitry 610.

The transient damping system 620 is configured to damp transients in the regulated output voltage due to load steps. The transient damping system 620 includes a damping mechanism 630 and damping circuitry 650. The damping mechanism is configured to reduce effects of a load step on the regulated output voltage. The damping circuitry is configured to activate the damping mechanism at a time $t_{dm}$ which occurs prior to a time $t_{ls}$ at which a load step will occur and deactivate the damping mechanism at or after the time $t_{ls}$. In this manner, the damping circuitry 650 controls the damping mechanism 630 in a feed-forward manner to activate the damping mechanism prior to the load step.

Figure 7:
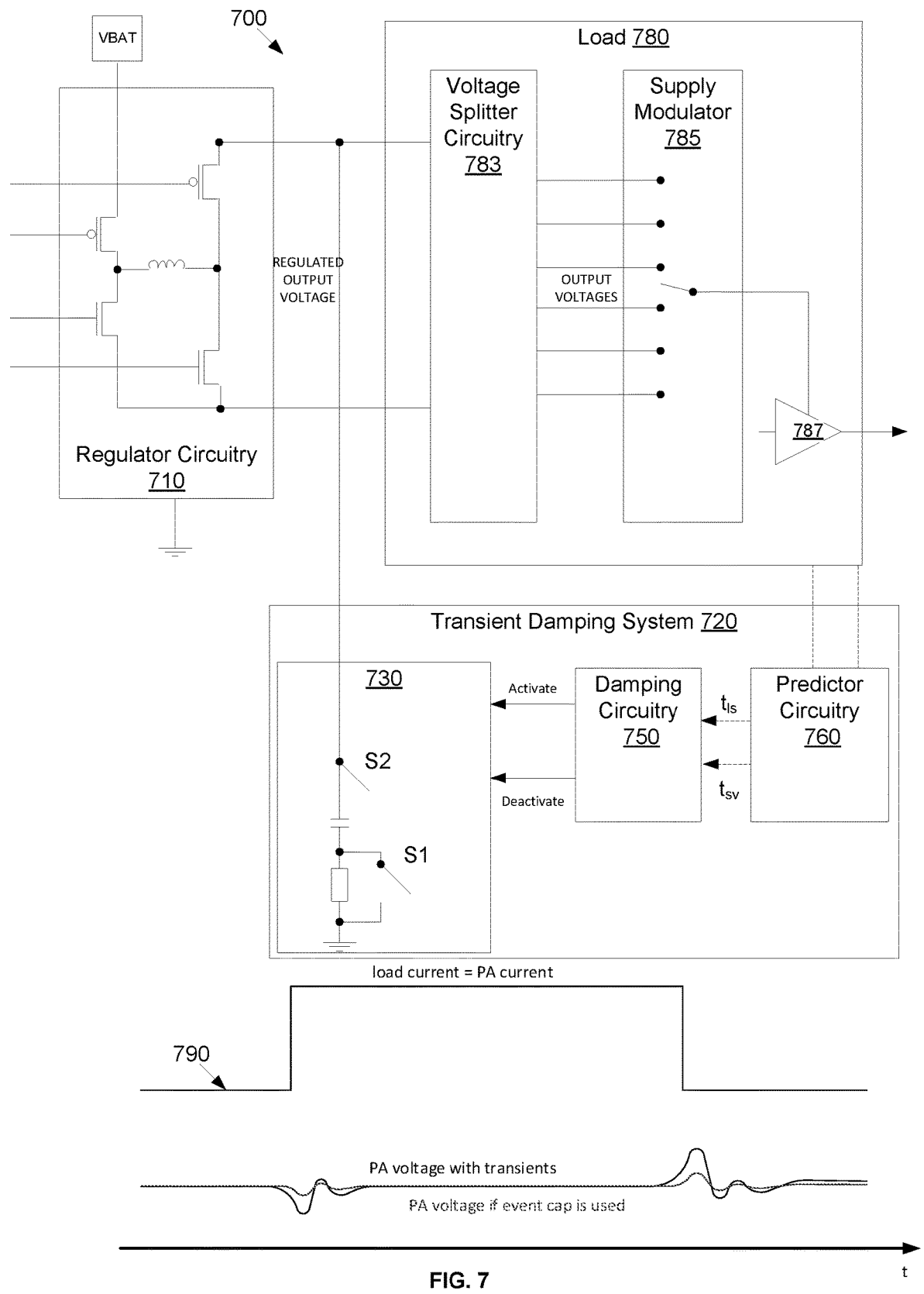
FIG. 7 illustrates an exemplary voltage regulation system that includes a transient damping system in accordance with various aspects described.

FIG. 7 illustrates a voltage regulator system 700 that includes an exemplary transient damping system 720. Regulator circuitry 710 includes a buck-boost DCDC converter which is coupled to a load 780. The load 780 includes a voltage splitter circuitry 783 (i.e., switched capacitor network or charge pump) which splits the DCDC regulated output voltage into N output voltages. A supply modulator 785 connects a selected one of these N output voltages to the power supply input of a power amplifier 787 to support an envelope tracking architecture in which the regulated output voltage to the power amplifier 787 is scaled proportionally to the signal being transmitted. In addition to the load steps experienced when the power amplifier 787 shifts operation between a high power mode of operation and a low power mode of operation, load steps also occur when the N output voltages are scaled to provide a different set of output voltages.

Predictor circuitry 760 is configured to determine that the output voltages are to be scaled at a time $t_{sv}$, and also predict a time $t_{ls}$ when a load step will occur due to the power amplifier shifting operation between a high power mode of operation and a low power mode of operation (e.g., between ON, OFF, and SLEEP). In one example the predictor circuitry 760 is configured to determine the time $t_{ls}$ based on a symbol transmission schedule. The predictor circuitry 760 may communicate with a programming interface of the regulator circuitry 710 and generate an event when a change in the regulated output voltage has been programmed. The predictor circuitry 760 provides times $t_{sv}$ and $t_{ls}$ to the damping circuitry 750 which, in response, activates and deactivates an artificial load 730 as follows.

The damping mechanism of the transient damping system 720 includes the artificial load block 730 that is connected to an output of the regulator circuitry 710. The connection point between the regulator circuitry 710 and the artificial load block 730 can be either before the voltage splitter circuitry 783 as shown or after the voltage splitter circuitry 783 or after the supply modulator 785. The artificial load block includes a capacitance (e.g., capacitor) and a resistive element connected in series between the regulated output voltage and a second potential (e.g., ground). A low-ohmic switch S1 is connected in parallel to the resistive element. S1 is closed at (or before) time $t_{dm}$ to subject the regulated output voltage to the full damping effect of the capacitor. The low-ohmic switch S1 is opened at time tsv to cause the resistive load to be in series with the capacitor. This opening of S1 deactivates the artificial load 730 by reducing or effectively eliminating the damping effect of the capacitor and allow for quicker scaling of the output voltages.

In one example, the artificial load block 730 includes a capacitor switch S2 (shown in dashed line) that can open the connection between the capacitor and the regulated output voltage. The resistive element (e.g., resistor) is connected in series with the capacitor. The low-ohmic switch S1 is connected in parallel with the resistive element. In one example, the resistance of a resistive element can be emulated by activating only a portion of the switch S1.

When S2 is used, damping circuitry 750 is configured to activate the artificial load block 730 by closing the capacitor switch S2 and opening the low-ohmic switch S1 prior to time $t_{dm}$ to gradually charge the capacitor and then closing the low-ohmic switch S2 at time $t_{dm}$. In this manner, a large bulk capacitance is connected at the output of the voltage regulator 710 that can be charged gradually and deactivated abruptly by opening S2. The resistive element in series with the capacitance enables the capacitance to be added slowly via an RC-constant by first closing S2 and then S1. Otherwise the addition of the capacitance (which may be discharged) would cause a large regulated output voltage transient itself. The resistive element prevents the capacitance from pulling down the regulated output voltage in reaction to the added capacitance. When the capacitance is fully charged to the regulated output voltage the resistive element is shorted with the low-ohmic switch S1. From this time on the capacitance is fully effective and can damp load steps. When the load step or change in the regulated output voltage provided to the power amplifier occurs it is buffered by this large capacitance.

In response to a signal from the predictor circuitry 760 that the output voltages will scaled at a time $t_{sv}$ the damping circuitry 750 is configured to open the capacitor switch S2 at time $t_{sv}$. This is because the capacitance should be removed from the regulator circuitry 710 when the output voltage of the supply modulator 785 is changed. Otherwise the time for changing/scaling the voltage could be unacceptably large. The damping circuitry 750 may also be configured to close the low-ohmic switch after a certain duration of time or after or in response to a settling signal generated by the regulator circuitry 710.

In this manner, when a voltage scaling event is about to happen, the capacitor can be removed abruptly by opening S2 so the voltage can be scaled rapidly. After the voltage scaling is complete, the capacitance can be added again slowly by closing S2 and opening S1 and then closing S1 without significant effect on the regulated output voltage. The controller transfer function can be modified dynamically depending on the connection of the cap in order to keep the control loop stable. This may be accomplished by parameter modification of regulator circuitry 710.

The plot 790 illustrates power amplifier current and voltage during a load step. The dark line in the voltage plot illustrates the voltage when the artificial load block 730 is connected to the voltage regulator 710. The gray line in the voltage plot illustrates the voltage when the artificial load block 730 is not connected to the voltage regulator 710. It can be seen that the capacitance of the artificial load block 730 helps to reduce the voltage transient, i.e. the voltage error caused by the load current step.

Figure 8:
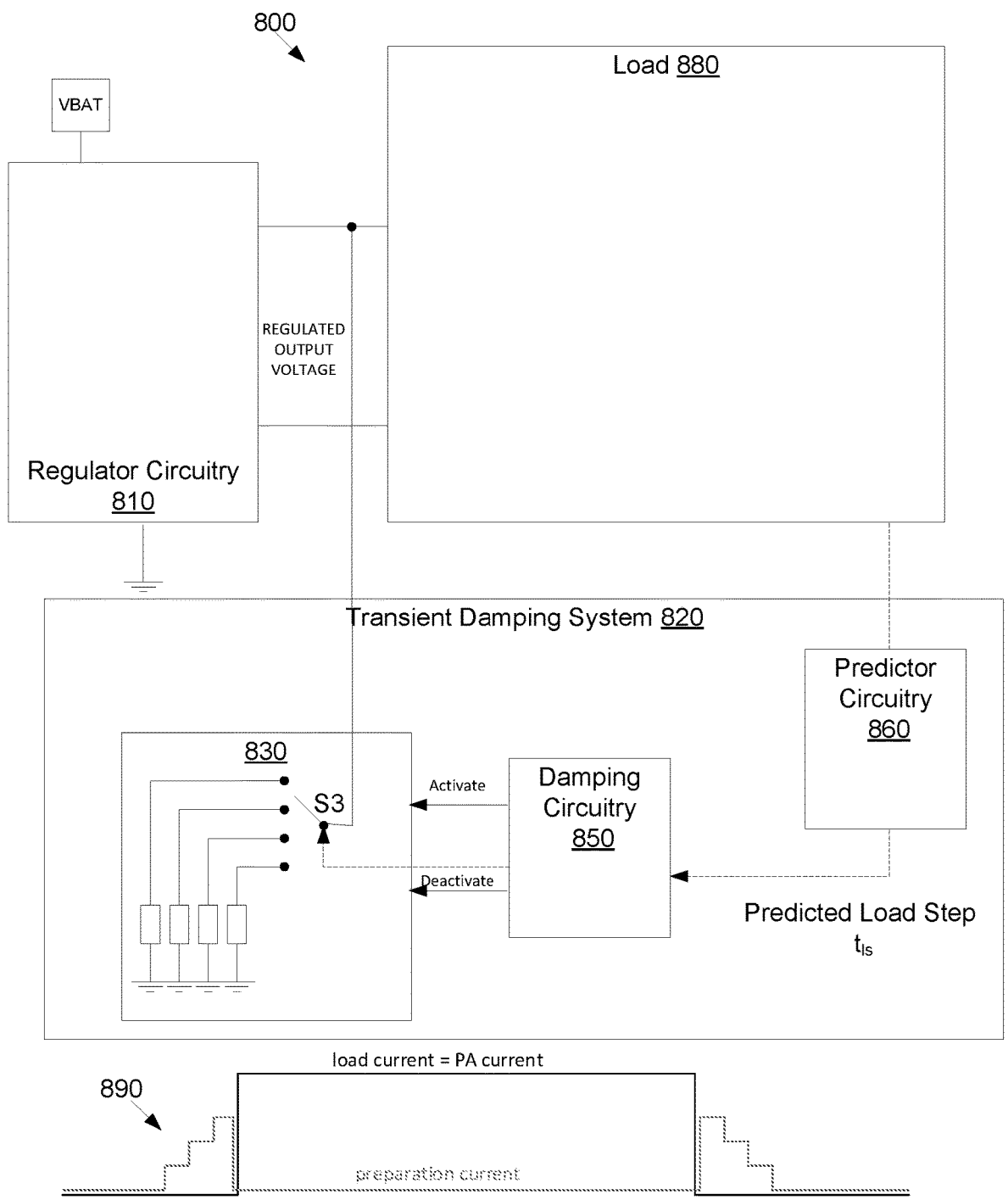
FIG. 8 illustrates an exemplary voltage regulation system that includes a transient damping system in accordance with various aspects described.

FIG. 8 illustrates a voltage regulator system 800 that includes an exemplary transient damping system 820. Regulator circuitry 810 is coupled to a load 880. Predictor circuitry 860 is configured to determine a time $t_{ls}$ when a load step will occur due to the power amplifier being powered between ON, OFF, and SLEEP. In one example the predictor circuitry 860 is configured to determine the time $t_{ls}$ based on a symbol transmission schedule. The predictor circuitry 860 provides time $t_{ls}$ to the damping circuitry 850 which, in response, activates and deactivates an artificial load 830 as follows.

The damping mechanism of the transient damping system 820 includes the artificial load block 830 that is connected to an output of the regulator circuitry 810 and a load switch S3 that connects the artificial load block 830 between the regulated output voltage and a second potential (e.g., ground). If the load 880 includes an envelope-tracking voltage modulator, the connection point between the regulator circuitry 810 and the artificial load block 830 can be either before a voltage splitter circuitry (not shown, see FIG. 7) as shown or after the voltage splitter circuitry or after a supply modulator (not shown, see FIG. 7). The artificial load block 830 includes one or more resistive elements connected between the regulator 810 and a second potential (e.g., ground). The damping circuitry 850 is configured to, when a positive load step will occur at time tls, control the load switch to close at time $t_{dm}$ and open at time $t_{ls}$. When a negative load step will occur at time $t_{ls}$, the damping circuitry 850 is configured to control the load switch to open at time $t_{dm}$ and close at time $t_{ls}$.

In this manner, a current load can be added to the voltage regulator 810 by switching resistive elements between the regulator output and ground. The load current can be varied by adding more or less resistive elements to the regulator 810. The different resistive elements may have different values (e.g., can be binary weighted). Equivalent resistive elements together with a thermometer code switching scheme is also possible. When a load step is about to occur the load to voltage regulator 810 is already increased by the artificial load block 830. Sweeping the load switch through resistive elements having increasing resistance in multiple small steps reduces the voltage regulator response (the voltage error). A single resistive elements together with a pulse width modulation of the load switch is used in another example in a load ramp waveform is applied to the load switch. At time $t_{ls}$ when the real load is activated, the load current created by the load block is deactivated. Then the full voltage regulator 810 current (which is already increased due to the artificial load block) is available to the real load. At a second time $t_{ls}$, when the real load is deactivated, the artificial load block can be re-connected to damp the negative load step. Current sources may be used in the artificial load block 830 instead of or in addition to the resistive elements.

In this manner, an artificial load is slowly added to the output of the voltage regulator 810 based on an estimation of the load step which is about to happen. The instance of the load step is well known and controlled by the transceiver. At the moment where the load step occurs the artificial load is deactivated abruptly and the actual load is activated. This way the effective load change seen by the voltage regulator is much smaller and so the voltage error is smaller The plot 890 shows the abrupt load current step together with the resulting load transient. The dark line in the voltage plot illustrates the voltage when the artificial load block 830 is connected to the voltage regulator 810. The gray line in the voltage plot illustrates the voltage when the artificial load block 830 is not connected to the voltage regulator 810. It can be seen that the gradual addition and removal of resistance by way of the artificial load block 830 causes the regulator circuitry 810 to generate "preparation current" that helps to reduce the voltage transient, i.e. the voltage error caused by the load current step.

Figure 9:
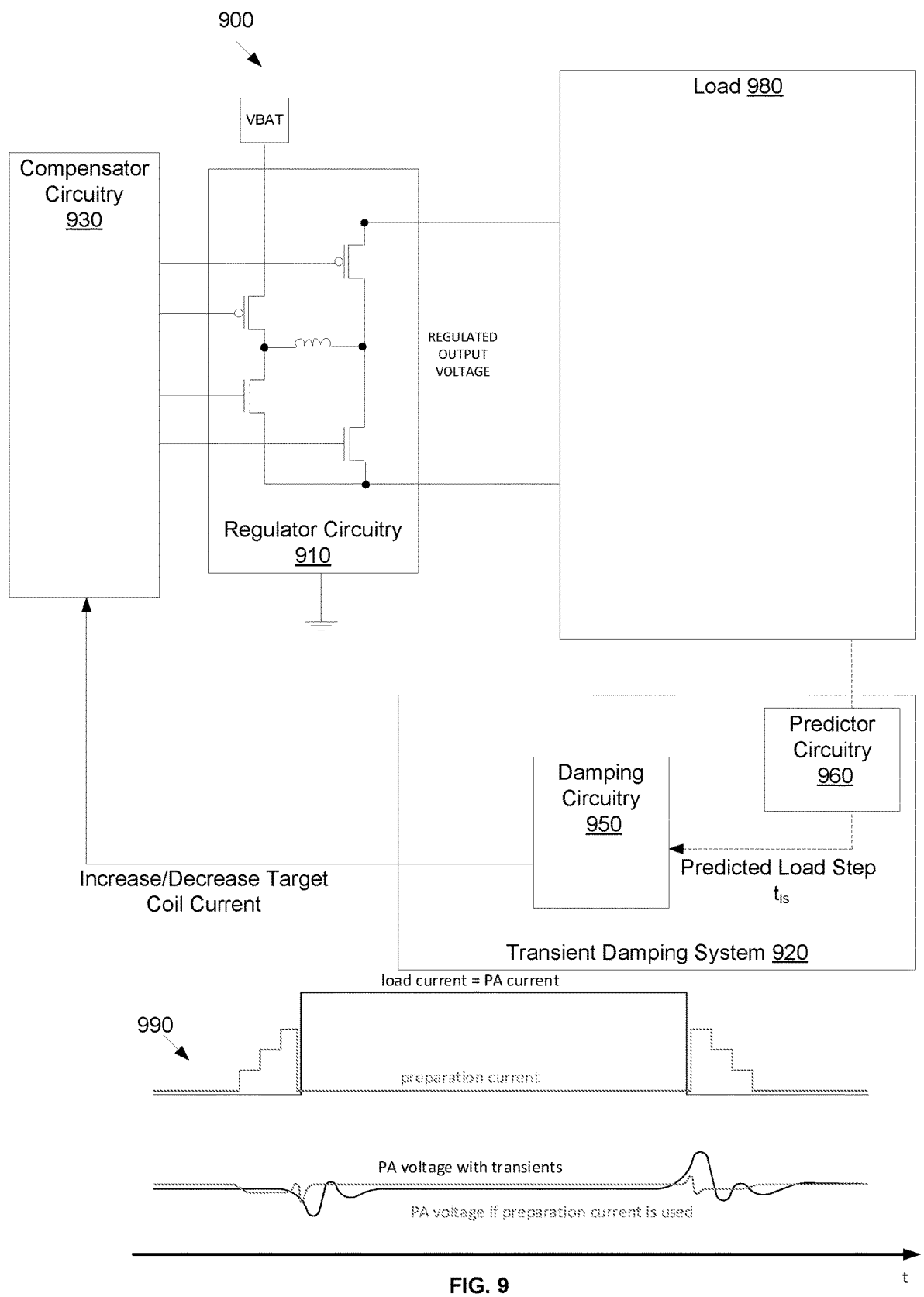
FIG. 9 illustrates an exemplary voltage regulation system that includes a transient damping system in accordance with various aspects described.

FIG. 9 illustrates a voltage regulator system 900 that includes an exemplary transient damping system 920. Regulator circuitry 910 includes a buck-boost DCDC converter which is coupled to a load 980. Predictor circuitry 960 is configured to determine a time $t_{ls}$ when a load step will occur due to the power amplifier being powered between ON, OFF, and SLEEP. In one example the predictor circuitry 960 is configured to determine the time $t_{ls}$ based on a symbol transmission schedule. The predictor circuitry 960 provides time $t_{ls}$ to the damping circuitry 950 which, in response, increases or decreases the target coil current as follows.

Recall that the supply current produced by the buck-boost DCDC converter of the regulator circuitry 910 is controlled by a buck-boost controller compensator circuitry 930 (i.e., a buck-boost controller) based in part on a target coil current (see FIGS. 1-3). The damping circuitry 950 is configured to, when a positive load step will occur at time tls, increase the target coil current at time $_{tdm}$ by a compensation amount. When a negative load step will occur at time tls, the damping circuitry 950 is configured to decrease the target coil current at time $t_{dm}$ by a compensation amount. Thus, the compensator circuitry 930 itself serves as the damping mechanism for the transient damping system 920. In one example, the compensation amount is considered in an integral part of the control law of the regulator circuitry 930.

The plot 990 shows the abrupt load current step together with the resulting load transient. The dark line in the voltage plot illustrates the voltage when the target coil current is adapted as described above to compensate for the load step. The gray line in the voltage plot illustrates the voltage when the target coil current is not adapted. It can be seen that the increase/decrease in target coil current by the compensation amount causes the regulator circuitry 910 to generate "preparation current" that helps to reduce the voltage transient, i.e. the voltage error caused by the load current step.

Figure 10:
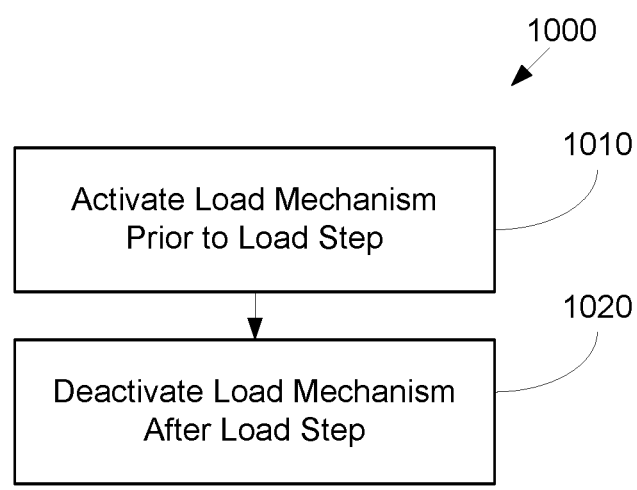
FIG. 10 illustrates an exemplary flow diagram of an exemplary method for transient damping in a voltage regulation system in accordance with various aspects described.

FIG. 10 illustrates a flow diagram outlining an exemplary method 1000 configured to damp transients in a regulated output voltage to a load that exerts a positive load step on the regulated output voltage when the load is connected to the regulated output voltage and exerts a negative load step on the regulated output voltage when the is load disconnected from the regulated output voltage. The method includes, at 1010, activating a damping mechanism at a time $t_{dm}$ which occurs prior to a time at which a load step occurs, wherein the damping mechanism is configured to reduce effects of a load step on the regulated output voltage. The method includes, at 1020, deactivating the damping mechanism at or after the time at which the load step occurs.

It can be seen from the foregoing description that the circuitries, methods, and systems described herein use forward looking knowledge of the load step event to prepare for a load step and to reduce the effects of the load step on regulated output voltage. Thus, a much smaller and smoother reaction to the load step is achieved compared to a pure regulator based approach.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for adapting the operation of a TDC according to embodiments and examples described herein.

Example 1 is a buck-boost control system configured to control a buck-boost converter to operate in a first operating mode corresponding to either a buck mode or a boost mode. The buck-boost converter includes a coil having a coil current that is selectively controlled by a set of buck-boost switches. The buck-boost control system includes compensator circuitry and mode control circuitry. The compensator circuitry is to determine a target current based on a difference between a target voltage and a regulated output voltage of the buck-boost converter; determine a tolerance current that, with the target current, defines a range of expected coil current for the first operating mode; and based on the difference between the target voltage and the regulated output voltage, generate a charge control signal or a discharge control signal for the buck-boost converter to cause the coil current to approach the target current. The mode control circuitry is configured to switch the buck-boost converter from the first operating mode to the second operating mode when the coil current reaches the tolerance current.

Example 2 includes the subject matter of example 1, including or omitting optional elements, wherein the mode control circuitry includes a tolerance current sensor configured to receive the coil current; compare the coil current to the tolerance current; and generate a tolerance hit signal when the coil current is equivalent to the tolerance current.

Example 3 includes the subject matter of example 1, including or omitting optional elements, wherein the mode control circuitry includes a mode select circuitry configured to, in response to the coil current reaching the tolerance current, generate a buck or boost mode selection signal that causes the buck-boost switches to be controlled according to a selected one of a buck mode switching scheme or a boost mode switching scheme.

Example 4 includes the subject matter of example 3, including or omitting optional elements, wherein mode select circuitry is configured to generate a peak or valley switching mode selection signal that selects either a peak switching mode or a valley switching mode for the buck-boost switches based on a relative duration of a variable phase of the coil current as compared to a duration of a fixed phase of the coil current.

Example 5 includes the subject matter of example 4, including or omitting optional elements, further including mapper circuitry configured to translate the charge control signal and the discharge control signal into control signals for the buck-boost switches based on the first operating mode and the selected peak or valley switching mode.

Example 6 includes the subject matter of example 1, including or omitting optional elements, further including a voltage sensor configured to compare the regulated output voltage with a supply voltage and generate a difference signal indicative of the difference between the regulated output voltage and the supply voltage. The mode control circuitry is configured to refrain from switching the buck-boost converter to the second operating mode when the difference exceeds a switching threshold.

Example 7 is a method configured to control a buck-boost converter to operate in a first operating mode corresponding to either a buck mode or a boost mode. The buck-boost converter includes a coil having a coil current that is selectively controlled by a set of buck-boost switches. The method includes determining a target current based on a difference between a target voltage and a regulated output voltage of the buck-boost converter; determining a tolerance current that, with the target current, defines a range of expected coil current for the first operating mode; and switching the buck-boost converter from the first operating mode to the second operating mode when the coil current reaches the tolerance current.

Example 8 includes the subject matter of example 7, including or omitting optional elements, further including generating a mode selection signal that causes the buck-boost switches to be controlled according to a selected one of a buck mode switching scheme or a boost mode switching scheme in response to the coil current reaching the tolerance current.

Example 9 includes the subject matter of example 7, including or omitting optional elements, further including generating a peak or valley switching mode selection that selects either a peak switching mode or a valley switching mode for the buck-boost switches based on a relative duration of a variable phase of the coil current as compared to a duration of a fixed phase of the coil current.

Example 10 includes the subject matter of example 7, including or omitting optional elements, further including translating a charge control signal into control signals for the buck-boost switches based on the first operating mode; and translating a discharge control signal into control signals for the buck-boost switches based on the first operating mode.

Example 11 includes the subject matter of example 7, including or omitting optional elements, further including comparing the regulated output voltage with a supply voltage; generating a difference signal indicative of the difference between the regulated output voltage and the supply voltage, and refraining from switching the buck-boost converter to the second operating mode when the difference exceeds a switching threshold.

Example 12 is a transient damping system configured to damp transients in a regulated output voltage to a load that exerts a positive load step on the regulated output voltage when the load increases power consumption and exerts a negative load step on the regulated output voltage when the load decreases power consumption. The transient damping system includes a damping mechanism and damping circuitry. The damping mechanism is configured to reduce effects of a load step on the regulated output voltage. The damping circuitry is configured to activate the damping mechanism at a time $t_{dm}$ which occurs prior to a time $t_{ts}$ at which a load step will occur and deactivate the damping mechanism at or after the time $t_{ls}$.

Example 13 includes the subject matter of example 12, including or omitting optional elements, wherein the damping mechanism includes a capacitor connected to the regulated output voltage; a resistive element connected in series between the capacitor and a second potential; and a low-ohmic switch connected in parallel with the resistive element. The damping circuitry is configured to activate the damping mechanism by closing the low-ohmic switch at time $t_{dm}$.

Example 13 includes the subject matter of example 12, including or omitting optional elements, wherein the regulated output voltage is processed by a voltage splitter circuitry that generates at least two different output voltages from the regulated output voltage, wherein a supply modulator is controlled to selectively connect one of the at least two different output voltages to the load. The transient damping system further includes predictor circuitry configured to determine that the at least two output voltages will be scaled to at least two different output voltages at a time $t_{sv}$. The damping circuitry is configured to open the low-ohmic switch prior to time $t_{sv}$.

Example 15 includes the subject matter of example 13, including or omitting optional elements, wherein the regulated output voltage is processed by a voltage splitter circuitry that generates at least two different output voltages from the regulated output voltage and the supply modulator is controlled to selectively connect one of the at least two different output voltages to the load. The transient damping system further includes a capacitor switch that connects the capacitor between the regulated output voltage and the resistive element and predictor circuitry configured to determine that a different output voltage will be connected to the load at a time $t_{sv}$. The damping circuitry is configured to close the capacitor switch prior to time $t_{dm}$ and open the low-ohmic switch at time $t_{sv}$.

Example 16 includes the subject matter of example 12, including or omitting optional elements, further including a predictor circuitry configured to determine the time $t_{ls}$ at which a next load step will occur.

Example 17 includes the subject matter of example 16, including or omitting optional elements, wherein the load is a power amplifier and the predictor circuitry is configured to determine the time $t_{ls}$ based on a symbol transmission schedule.

Example 18 includes the subject matter of example 16, including or omitting optional elements, wherein the damping mechanism includes an artificial load block and a load switch that connects the artificial load block between the regulated output voltage and ground. The damping circuitry is configured to, when a positive load step will occur at time $t_{ls}$, control the load switch to close at time $t_{dm}$ and open at time $t_{ls}$. When a negative load step will occur at time $t_{ls}$, the damping circuitry is configured to control the load switch to and close at time $t_{ls}$ and open at time $t_{dm}$.

Example 19 includes the subject matter of example 16, including or omitting optional elements, wherein the damping mechanism includes a buck-boost controller that controls a regulated output voltage of a buck-boost converter based on a target coil current. The damping circuitry is configured to, when a positive load step will occur at time $t_{ls}$, increase the target coil current at time $t_{dm}$ by a compensation amount; and, when a negative load step will occur at time $t_{ls}$, decrease the target coil current at time $t_{dm}$ by the compensation amount.

Example 20 is a method configured to damp transients in a regulated output voltage supplied to a load, wherein the load exerts a positive load step on the regulated output voltage when the load increases power consumption and exerts a negative load step on the regulated output voltage when the load decreases power consumption. The method includes activating a damping mechanism at a time $t_{dm}$ which occurs prior to a time at which a load step occurs, wherein the damping mechanism is configured to reduce effects of a load step on the regulated output voltage; and deactivating the damping mechanism at or after the time at which the load step occurs.

Example 21 includes the subject matter of example 19, including or omitting optional elements, wherein damping mechanism includes a capacitor connected to the regulated output voltage. Activating the damping mechanism includes at time $t_{dm}$ closing a low-ohmic switch, wherein the low-ohmic switch is connected in series between the capacitor and a second potential.

Example 22 includes the subject matter of example 21, including or omitting optional elements, wherein the regulated output voltage is processed by a voltage splitter circuitry that generates at least two different output voltages from the regulated output voltage, wherein the supply modulator is controlled by a tracking system to selectively connect one of the at least two different output voltages to the load. The method further includes determining that the at least two output voltages will be scaled to at least two different output voltages at a time $t_{sv}$; and opening the low-ohmic switch at time $t_{sv}$.

Example 23 includes the subject matter of example 20, including or omitting optional elements, further including determining a time $t_{ls}$ at which a next load step will occur.

Example 24 includes the subject matter of example 23, including or omitting optional elements, further including, when a positive load step will occur at time $t_{ls}$, closing a load switch that connects an artificial load between the regulated output voltage to ground at time $t_{dm}$ and opening the load switch at time $t_{ls}$. When a negative load step will occur at time $t_{ls}$, the method includes opening the load switch at time $t_{dm}$ and closing the load switch at time $t_{ls}$.

Example 25 includes the subject matter of example 20, including or omitting optional elements, further including, when a positive load step will occur at time $t_{ls}$, increasing a target coil current by a compensation amount at time $t_{dm}$, wherein the target coil current is used by a buck-boost controller to control a regulated output voltage of a buck-boost converter. When a negative load step will occur at time $t_{ls}$, the method includes decreasing the target coil current by the compensation amount at time $t_{dm}$.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. The various illustrative logics, logical blocks, modules, and circuits described in connection with aspects disclosed herein can be implemented or performed with a general purpose processor executing instructions stored in computer readable medium.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. The use of the phrase "one or more of A, B, or C" is intended to include all combinations of A, B, and C, for example A, A and B, A and B and C, B, and so on.

What is claimed is:

1. A buck-boost control system configured to control a buck-boost converter to operate in either a buck mode or a boost mode, the buck-boost control system comprising:
    compensator circuitry configured to:
        determine a target current based on a difference between a target voltage and a regulated output voltage of the buck-boost converter;
        determine a tolerance current, wherein the tolerance current is offset from the target current by a predetermined offset and, with the target current, defines a range of expected coil current for a first operating mode; and
        based on the difference between the target voltage and the regulated output voltage, generate a charge control signal or a discharge control signal for the buck-boost converter for the coil current to reach the target current; and
    mode control circuitry configured to switch the buck-boost converter from the first operating mode to a second operating mode when the coil current reaches the tolerance current.

2. The buck-boost control system of claim 1, wherein the mode control circuitry comprises a tolerance current sensor configured to:
    receive the coil current;
    compare the coil current to the tolerance current; and
    generate a tolerance hit signal when the coil current is equivalent to the tolerance current.

3. The buck-boost control system of claim 1 wherein the mode control circuitry comprises a mode select circuitry configured to, in response to the coil current reaching the tolerance current, generate a buck or boost mode selection signal to control buck-boost switches in the buck-boost converter based on a selected one of a buck mode switching scheme or a boost mode switching scheme.

4. The buck-boost control system of claim 3, wherein the mode select circuitry is configured to generate a peak or valley switching mode selection signal that selects either a peak switching mode or a valley switching mode for the buck-boost switches based on a relative duration of a variable phase of the coil current as compared to a duration of a fixed phase of the coil current.

5. The buck-boost control system of claim 4, further comprising mapper circuitry configured to translate the charge control signal and the discharge control signal into control signals for the buck-boost switches based on the operating mode and the selected peak or valley switching mode.

6. The buck-boost control system of claim 1, further comprising:
    a voltage sensor configured to:
        compare the regulated output voltage with a supply voltage; and
        generate a difference signal indicative of a difference between the regulated output voltage and the supply voltage, and
    wherein the mode control circuitry is configured to refrain from switching the buck-boost converter to the second operating mode when the difference signal exceeds a switching threshold.

7. A method configured to control a buck-boost converter to operate in either a buck mode or a boost mode, the method comprising:
    determining a target current based on a difference between a target voltage and a regulated output voltage of the buck-boost converter;
    determining a tolerance current, wherein the tolerance current is offset from the target current by a predetermined offset and, with the target current, defines a range of expected coil current for a first operating mode; and
    switching the buck-boost converter from the first operating mode to a second operating mode when the coil current reaches the tolerance current.

8. The method of claim 7, further comprising generating a mode selection signal to control buck-boost switches in the buck-boost converter based on a selected one of a buck mode switching scheme or a boost mode switching scheme in response to the coil current reaching the tolerance current.

9. The method of claim 7, further comprising generating a peak or valley switching mode selection that selects either a peak switching mode or a valley switching mode for buck-boost switches in the buck-boost converter based on a relative duration of a variable phase of the coil current as compared to a duration of a fixed phase of the coil current.

10. The method of claim 7, further comprising:
    translating a charge control signal into control signals for buck-boost switches in the buck-boost converter based on the first operating mode; and
    translating a discharge control signal into control signals for the buck-boost switches based on the first operating mode.

11. The method of claim 7, further comprising:
    comparing the regulated output voltage with a supply voltage; and generating a difference signal indicative of a difference between the regulated output voltage and the supply voltage;

refraining from switching the buck-boost converter to the second operating mode when the difference signal exceeds a switching threshold.

12. A buck-boost system, comprising:
   a buck-boost converter configured to operate in either a buck mode or a boost mode; and
   a buck-boost control system, comprising:
      compensator circuitry configured to:
         determine a target current based on a difference between a target voltage and a regulated output voltage of the buck-boost converter;
         determine a tolerance current, wherein the tolerance current is offset from the target current by a predetermined offset and, with the target current, defines a range of expected coil current for a first operating mode; and
         based on the difference between the target voltage and the regulated output voltage, generate a charge control signal or a discharge control signal for the buck-boost converter for the coil current to reach the target current; and
      mode control circuitry configured to switch the buck-boost converter from the first operating mode to a second operating mode when the coil current reaches the tolerance current.

13. The buck-boost system of claim 12, wherein the mode control circuitry comprises a tolerance current sensor configured to:
   receive the coil current;
   compare the coil current to the tolerance current; and
   generate a tolerance hit signal when the coil current is equivalent to the tolerance current.

14. The buck-boost system of claim 12, wherein the mode control circuitry comprises a mode select circuitry configured to, in response to the coil current reaching the tolerance current, generate a buck or boost mode selection signal to control buck-boost switches in the buck-boost converter based on a selected one of a buck mode switching scheme or a boost mode switching scheme.

15. The buck-boost system of claim 14, wherein the mode select circuitry is configured to generate a peak or valley switching mode selection signal that selects either a peak switching mode or a valley switching mode for the buck-boost switches based on a relative duration of a variable phase of the coil current as compared to a duration of a fixed phase of the coil current.

16. The buck-boost system of claim 15, further comprising mapper circuitry configured to translate the charge control signal and the discharge control signal into control signals for the buck-boost switches based on the operating mode and the selected peak or valley switching mode.

17. The buck-boost system of claim 12, further comprising:
   a voltage sensor configured to:
      compare the regulated output voltage with a supply voltage; and
      generate a difference signal indicative of a difference between the regulated output voltage and the supply voltage, and
   wherein the mode control circuitry is configured to refrain from switching the buck-boost converter to the second operating mode when the difference signal exceeds a switching threshold.

* * * * *